United States Patent [19]

Basso et al.

[11] 3,868,511

[45] Feb. 25, 1975

[54] DOSIMETER LATCH

[75] Inventors: Michael J. Basso, West Allenhurst; Stanley Kronemberg, Skillman, both of N.J.

[73] Assignee: The United States of America as represented by the Secretary of the Army, Washington, D.C.

[22] Filed: Apr. 4, 1974

[21] Appl. No.: 457,870

[52] U.S. Cl............................. 250/376, 250/390
[51] Int. Cl............................................. G01t 1/14
[58] Field of Search........................... 250/376, 390

[56] References Cited
UNITED STATES PATENTS

| 3,144,557 | 8/1964 | Minton | 250/376 |
| 3,628,019 | 12/1971 | Jackson | 250/376 |
| 3,707,632 | 12/1972 | Cooper et al. | 250/390 X |

Primary Examiner—Archie R. Borchelt
Attorney, Agent, or Firm—Robert P. Gibson; Nathan Edelberg; Arthur L. Bowers

[57] ABSTRACT

A pen size dosimeter designed to be viewed longitudinally for reading dosage of neutron radiation and gamma radiation and that is reset by being charged through a conductor pin carried by a longitudinally compressible spring urged assembly near one end of the dosimeter but which may lose the correct dosage reading under shock and vibration conditions is improved by the addition of a novel latch for the spring-urged asembly to release the spring urged assembly to permit displacement for charging and to relatch when charging is terminated.

3 Claims, 5 Drawing Figures

PATENTED FEB 25 1975

DOSIMETER LATCH

BACKGROUND OF THE INVENTION

In Health Physics, a publication of Pergamon Press, volume 14, 1968, pages 41–44, there is an illustrated article entitled Tactical Radiation Dosimetry in the U.S. Army authored by coinventor Stanley Kronenberg. The article describes a resettable pen size dosimeter to be carried on one's person when in a radiation field for measuring gamma and neutron radiation dose. This enables one to check at intervals the radiation dose he has been exposed to since the dosimeter was reset. In that dosimeter, the sensitive section is a quartz fiber electrometer assembly located in a vacuum chamber inside a plastic housing which is coated on the inside surface with a thin coating of metal. Discharge of the electrometer, i.e., approach of the flexed quartz fiber to its companion support member, is caused by secondary electrons emitted from the metal coating. In response to incident gamma radiation, photo, Compton, or pair-electrons produced in the chamber wall cause secondary electrons to be emitted into the chamber. When high energy neutrons are intercepted by the electrometer, protons are dislodged from the wall and urge secondary electrons out of the metal coating in their wake. The yield of secondary electrons produced by either of the primary particles, electrons or protons, is related to the energy delivered by these primary particles within the secondary electron escape layer. Light can pass through the electrometer and the quartz fiber is in the path of the light. The dosimeter has an optical section that includes a reticle. A shadow is cast on the reticle by the quartz fiber and is viewed through an eyepiece of the optical section. The dosimeter has a longitudinal conductor for delivering charging current to the electrometer to reset the latter to zero. The conductor extends longitudinally toward the end opposite the optical section and extends through and is sealed into a light transmitting window. The window is bellows mounted for limited displacement toward and away from the electrometer. A spring in the bellows urges the window to its outward position and thereby decouples the conductor from the electrometer. When the bellows end of the dosimeter is forced manually against a special charging fixture, the window is moved to its other inward position against the bias of the spring in the bellows and there is electrical continuity among the conductor and the electrometer elements and the charging source. In this manner the dosimeter is reset. The dosimeter functions satisfactorily except when subjected to substantial shock or vibration. The conductor shifts apparently against the spring bias and the reading changes. Dosage registration has been rendered meaningless by shock when the dosimeter was dropped or when severely vibrated and literally vital radiation exposure information was lost. The bellows spring is made as stiff as practical to resist movement of the conductor but it cannot be made so stiff as to effectively resist compression when the dosimeter is forced manually against the charging fixture.

SUMMARY OF THE INVENTION

This invention concerns the addition of a latch mechanism to engage the dosimeter movable window frame to positively lock the conductor against longitudinal displacement but which latch mechanism is releasable for reset when the dosimeter is engaged with a special charging fixture, and is relatchable when the dosimeter is separated from the charging fixture. The spring of the window support, previously made very stiff to resist shock or vibration induced loss of dosimeter reading, is made with reduced spring constant for facilitating compression of the spring when the dosimeter is forced against the charging fixture for reset.

DESCRIPTION OF A PREFERRED EMBODIMENT

Figure 2:
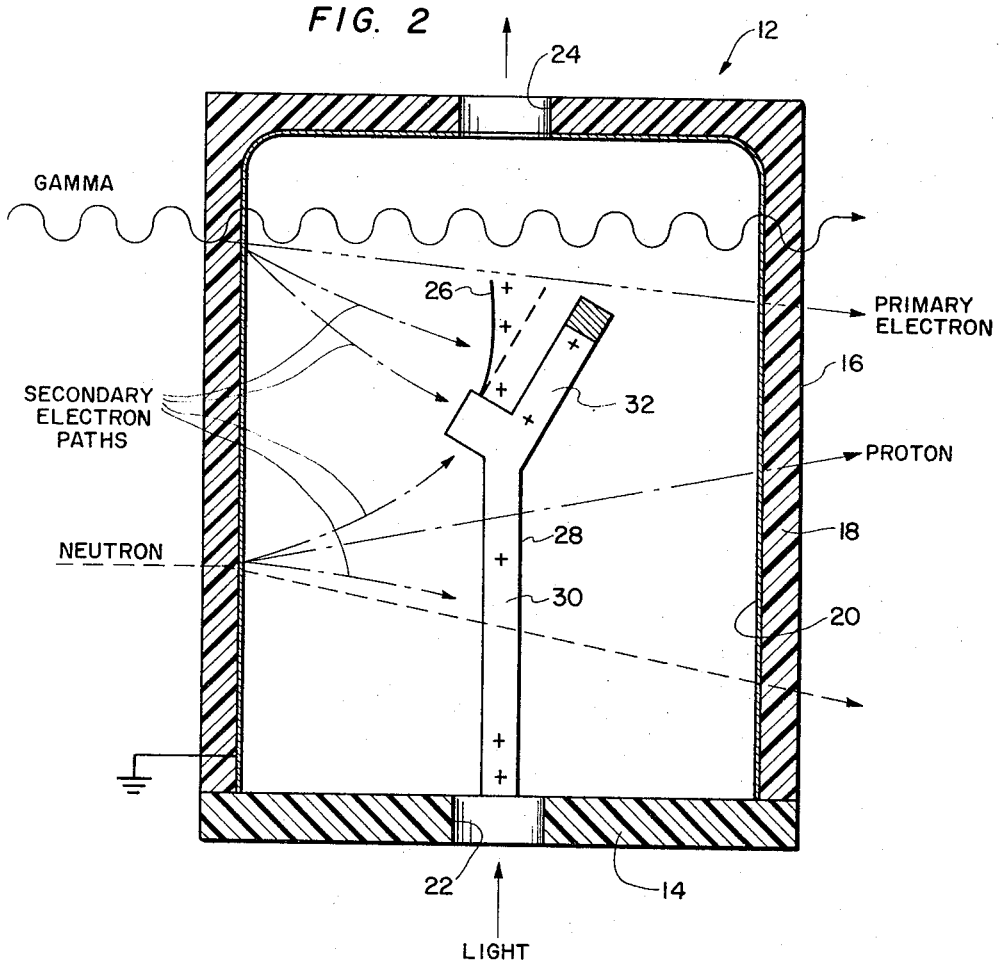
FIG. 2 is a cross sectional view of the type of electrometer used in the dosimeter of FIG. 1 and including showings of exemplary incident gamma and neutron radiation and primary and secondary particles dislodged thereby.

A dosimeter of the type described in the publication cited above is packaged in a pen size barrel member 10. An electrometer assembly 12 is fixedly supported between the ends of the barrel. In a simplified form shown in FIG. 2, the electrometer includes a base 14 and a housing member 16 of a hydrogenous plastic material 18 with a large percentage of hydrogen in its composition and that has its inner surface coated with a very thin layer of conductor metal 20. Hydrogenous material when bombarded by high energy neutrons relinquishes hydrogen nuclei or protons. The base 14 and the opposite end of the housing 16 have in-line openings 22, 24 to provide a light path through the electrometer. A quartz fiber 26 bowed in a horseshoe configuration is fixed at its ends to a rigid conductor support 28 that has legs 30 spaced to straddle the opening and not to interfere with the light path and a horseshoe shaped portion 32 that bridges the legs. The portion 32 bridging the legs 30 is offset angularly relative to the legs so that it is not in the path of light passing through opening 22 in the direction of opening 24; the bowed quartz fiber is in the light path. The quartz fiber and the rigid conductor support are shown positively charged and because they are charged, the quartz fiber is electrostatically flexed away from the bridging portion 32; when they discharge, flexure is reduced till the quartz fiber is alongside the conductor support portion 32. When high-energy neutrons penetrate the hydrogenous wall material in the direction shown, high energy protons are emitted through the inner surface of the same side of housing 16. As the emitted protons traverse the thin metal coating 20 into the chamber, they influence low energy secondary electrons into their wake. These low energy electrons are readily collected by the positively charged electrometer elements. The total charge collected is a measure of the radiation dose intercepted by the dosimeter. The response mechanism of the electrometer differs somewhat for X-ray or gamma radiation. Compton electrons and photoelectrons are ejected from the housing material by the incident radiation and as these primary electrons traverse the thin metal coating, they cause emission of low energy secondary electrons and these secondary electrons are collected by the positively charged electrometer elements.

The electrometer 12 is contained in an evacuated section of the barrel 10, between light transmitting windows 34 and 36. An electronic vacuum pumping section 38 adjoins the electrometer and is made operative when coupled to a fixture provided for the purpose. Between the window 34 and the other end of the barrel is supported an objective lens assembly 38, a reticle 40 and an eyepiece 42. The shadow cast by the quartz fiber on the reticle indicates radiation dose.

Figure 1:
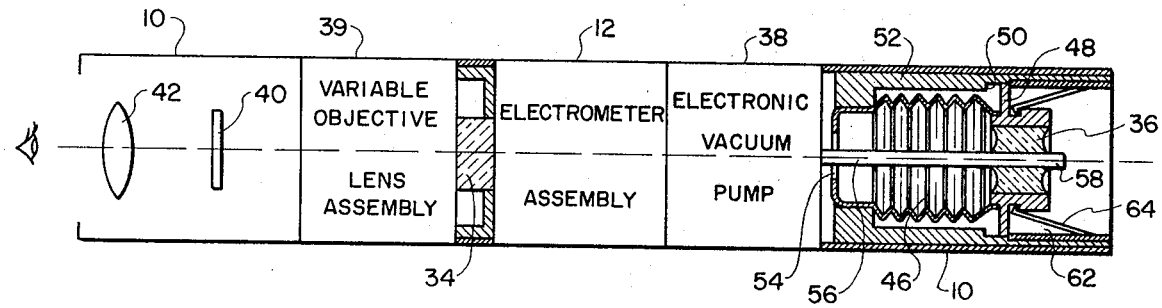
FIG. 1 is a longitudinal view partly diagrammatic, partly block diagram, and partly in secion of the prior art dosimeter, and including a latch according to this invention at the right hand end of the figure.

The window 36 is supported inward of the end of the barrel by a resilient hermetically sealed bellows 46 that includes spring means for urging the window in the outward direction to the position shown in FIG. 1. The window is sealed in a frame 48 that in turn is sealed to the bellows and can be urged inward by compressing the bellows till the frame 48 abuts shoulder 50 of a sleeve 52 to which is sealed the other end of the bellows. The inner end of the bellows has an opening 54. Rigid conductor means 56 is sealed into window 36 with stub end 58 extending outwardly of the window into the recess at the end of the barrel.

Figure 3:
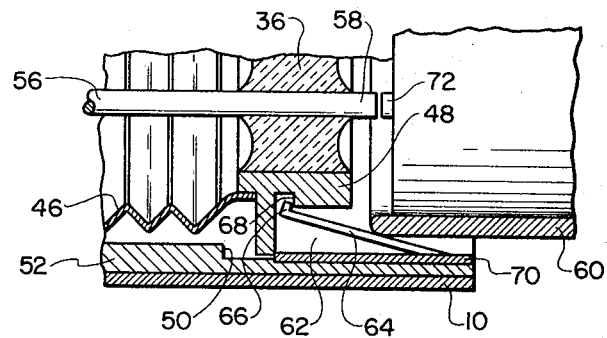
FIG. 3 is a fragmentary sectional view of the right end of the dosimeter in Figure in position in a charging fixture but not forced against the fixture.

A special charging fixture 60 of which only a fragment is shown in FIG. 3 is designed to deliver the voltage required for zeroing the dosimeter. The dosimeter is positioned manually in the fixture; by gripping the barrel 10 and forcing the dosimeter against the fixture, the bellows is compressed against the spring bias and the conductor means 56 is displaced inwardly a distance limited by the shoulder 50 thereby coupling the electrometer, the conductor means and the charging source. Heretofore, the spring of the bellows structure was made stiff to resist accidental loss or change of dosimeter reading due to shift of the conductor means in response to vibration or shock. The spring stiffness was limited by the maximum amount of force that might be applied manually by gripping the barrel and forcing the dosimeter longitudinally against the charging fixture to carry out the charging function. The spring was made such that a force of about 10 pounds was required to compress the bellows. The high spring constant did not obviate the problem and it made it difficult to carry out the charging function.

The embodiment of this invention shown in FIGS. 1 and 3 concerns a latch 62 for the type of dosimeter shown in the cited publication. The latch includes at least one but preferably several arcuately spaced spring fingers 64 having lateral detent tips 66 for engaging a circular edge 68 formed on the window frame 48. The spring fingers may be stamped from a flat spring metal blank, one end of each spring finger remaining integral with the blank and then at assembly, the stamped blank is curled into a ring 70 and installed in the end of the dosimeter and secured in place by securing a lip like retainer, not shown, or by fastening or by welding the member 70 in place. The inner end of member 70 is a stop for the window frame. The spring fingers prevent the window frame 48 and the conductor 56 from shifting inwardly unless the fingers are moved out of engagement with the window frame. The spring fingers are designed to be in the path of the charging fixture 60 when the dosimeter end having conductor stub 58 is telescoped with the charging fixture. The spring fingers are brushed aside and the tips 66 are moved out of the path of the edge 68 when the conductor stub 58 is very close to but not in butting engagement with the conductor 72 of the fixture 60. The spring fingers relatch automatically as the dosimeter is removed from the fixture 60.

Figure 4:
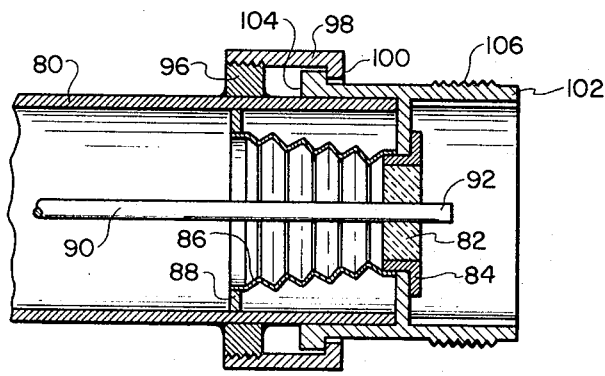
FIGS. 4 and 5 are a cross sectional view and an end view, respectively, of another embodiment of the invention in place on the end portion of the prior art type of dosimeter; in the end view only the sleeve and window frame are shown.
Figure 5:
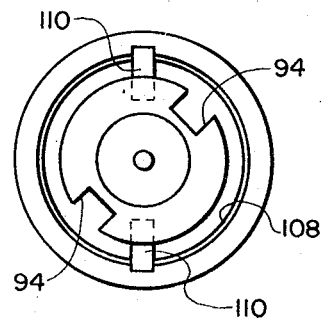

Another latch embodiment is shown in FIGS. 4 and 5. A comparatively simple structure for the dosimeter charging end is shown in FIG. 4 and includes a barrel 80, transparent window 82, window frame 84, spring biased bellows 86 sealed at its inner end to a ring 88 which in turn is secured and sealed to the inside of the barrel 10. A conductor 90 is sealed into the window with a stub 92 projecting through the window. The window frame has opposed radial notches 94. A ring 96 is fixed to the outside of the barrel a short distance from the end and a sleeve 98 threadedly engages the ring 96 and has an inwardly directed lip 100 at its other end. A latching sleeve 102 with an external lip 104, knurling 106 on its outer surface, and with an inside diameter for part of its length for a friction fit on the surface of the end of the barrel 80 is assembled on the end of the barrel with its external lip 104 engaging the lip 100 of sleeve 98. The inside diameter of the sleeve for the remainder of its length is smaller whereby there is a shoulder 108 to bear against the end of the barrel. Instead of a friction fit of the sleeve on the end of the barrel, the sleeve 98 may be tightened sufficiently for causing the end of the barrel and the shoulder 108 inside the latching sleeve to frictionally engage whereby the sleeve holds its position until positively turned. Radial tabs 110 are swaged from the inner wall of the latching sleeve. When the sleeve 102 is rotated to a position in which the tabs 110 are in registration with the radial slots in the window frame 84, the conductor can be forced inwardly for the charging operation. As soon as the charging operation is complete and the dosimeter is withdrawn from the charging fixture, the window frame slots and tabs are still in registration and the bellows forces the window frame and conductor outward. Then the sleeve is turned so that the slots and tabs are not in registration and the dosimeter is latched.

What is claimed is:

1. In combination with a pen size dosimeter in a cylindrical barrel of the type that has an electrometer designed for response to neutron and gamma radiation and that is included in an hermetically sealed assembly and that has a light path that extends through the electrometer, the sealed assembly being closed by a window at each end, the dosimeter including a calibrated reticle adjacent one window in line with the light path enabling one to read radiation dose, the hermetically sealed assembly also including longitudinally displaceable conductor means sealed into and projecting through the other window for coupling a charging source to the electrometer, said other window being in a frame that is yieldably supported in a bellows that is part of the sealed assembly and that is spring biased to expand and carries the conductor means out of coupling engagement with the electrometer, the improvement which comprises latching means for preventing longitudinal displacement of the conductor means when the dosimeter is not being charged.

2. In the combination recited in claim 1 wherein the latching means are spring fingers extending from the dosimeter barrel radially and longitudinally inwardly and normally engaging the window frame and in the path of any circular member that is telescoped a predetermined distance into the window frame end of the dosimeter whereby the spring fingers are disengaged from and reengaged with the window frame when a circular member is telescoped into and separated from the window frame end of the dosimeter.

3. The combination recited in claim 1 wherein the latching means includes a sleeve supported for frictionally restrained rotation on that outside end portion of the dosimeter that includes the framed window, the framed window having opposed radial slots, the sleeve having opposed radial tabs of a size such that when the frame slots and the sleeve tabs are in registration the slotted frame can move axially past the tabs, the framed window being spring-biased outwardly and when unrestrained and the tabs and slots are in registration the framed window is located outwardly of the tabs whereby the framed window may be latched in its outward position by arcuate displacement of the sleeve and may be urged inward temporarily when the slot and tabs are in registration.

* * * * *